United States Patent [19]

Dorward et al.

[11] Patent Number: 5,625,745
[45] Date of Patent: Apr. 29, 1997

[54] NOISE IMAGING PROTECTION FOR MULTI-CHANNEL AUDIO SIGNALS

[75] Inventors: Sean M. Dorward, Somerville; James D. Johnston, Warren, both of N.J.

[73] Assignee: Lucent Technologies Inc., Murray Hill, N.J.

[21] Appl. No.: 381,056

[22] Filed: Jan. 31, 1995

[51] Int. Cl.$^6$ .................................................. H04H 5/00
[52] U.S. Cl. ...................... 395/2.36; 395/2.39; 395/2.38; 381/73.1; 381/2
[58] Field of Search .......................... 395/2, 2.1, 2.35, 395/2.36, 2.38, 2.39; 381/2, 22, 23, 30, 73.1

[56] References Cited

U.S. PATENT DOCUMENTS 5,291,557   3/1994   Davis et al. ................................ 381/22

OTHER PUBLICATIONS

Warner R. Th. ten Kate, "Compatibility Matrixing of Multi-Channel Bit-Rate-Reduced Audio Signals", Preprint 3792 from 96th Convention of Audio Engineering Society, Amsterdam Feb. 1994.
Robbert G. van der Waal and Raymond N. J. Veldhuis, "Subband Coding of Stereophonic Digital Audio Signals", Proc. ICASSP '91, pp. 3601–3604 Apr. 1991.
Mark Black, "Computationally Efficient Wavelet Packet Coding of Wide-Band Stereo Audio Signals", Proc. ICASSP '95, pp. 3075–3078 May 1995.

W.R. Th. ten Kate, P.M. Boers, A. Makivirta, J. Kuusama, K.E. Christensen, and E. Sorensen, "Matrixing of Bit Rate Reduced Audio Signals", Proc. ICASSP '92, vol. II, pp. 205–208 Mar. 1992.

Primary Examiner—Allen R. Macdonald
Assistant Examiner—Tálivaldis Ivars Šmits
Attorney, Agent, or Firm—David M. Rosenblatt; Donald P. Dinella

[57] ABSTRACT

Techniques for encoding audio signals are disclosed wherein a left channel signal masking threshold and a right channel signal masking threshold may be advantageously adjusted. A given time block of a stereo audio signal comprises a left channel signal and a right channel signal, each of which are represented in a frequency domain by a first plurality of frequency partitions and a second plurality of frequency partitions, respectively. For a frequency partition from the first plurality of frequency partitions and a corresponding frequency partition from the second plurality of frequency partitions, a scheme first calculates a set of masking thresholds comprising the left channel masking threshold and the right channel masking threshold. Next, based upon the set of masking thresholds, the scheme calculates an adjusted left channel masking threshold and an adjusted right channel masking threshold. The adjusted thresholds may be advantageously used to encode the audio signal wherein the effect of noise unmasking is reduced.

6 Claims, 4 Drawing Sheets

NOISE IMAGING PROTECTION FOR MULTI-CHANNEL AUDIO SIGNALS

FIELD OF THE INVENTION

The present invention relates to the coding of audio signals. More specifically, the present invention relates to encoding multichannel audio signals such as stereo signals.

BACKGROUND OF THE INVENTION

Sometimes when we play a digital recording on a stereo the output sounds noisy. There are numerous factors that may make the sound emanating from our stereos more or less noisy.

Quantization of an audio signal to produce a digital recording introduces noise into the audio signal. The smaller the quantization step size, the less noise introduced. However, the smaller the quantization step size, the greater the number of bits required to store the digital recording.

Known techniques select quantization step sizes in such a manner so as to make the noise introduced by the quantization step size just imperceiveable to the human auditory system. Such a fundamental idea is discussed in U.S. Pat. No. 5,341,457 ("the '457 patent"), assigned to the assignee of the present invention and incorporated by reference herein as if set forth in its entirety. A technique described in the '457 patent determines a noise masking threshold (e.g., quantization step size) that, if used to encode, will introduce quantization noise that is just imperceiveable.

However, when the above technique is used for a multichannel, e.g., stereo signal, there are shortcomings. For example, in a stereo environment, the noise masking thresholds do not account for the effect on a listener of what is known as "noise unmasking." In stereo environment, "noise unmasking" occurs when noise introduced during quantization appears to the listener to emanate from a different direction than the sound the listener desires to hear. When this occurs, the quantization noise is said to be unmasked.

In attempting to solve the problem of noise unmasking, another technique was developed. Essentially, this technique describes adjusting noise masking thresholds of a sum channel signal ("S") and a difference channel signal ("D"). The adjusted noise masking thresholds provide additional protection against noise unmasking and, when selectively used, prove advantageous. However, the technique only adjusts noise masking thresholds for S and D (not for a left channel signal ("L") and a right channel signal ("R"). Thus, for encoders that do not use S and D to encode (i.e., encoders that encode always based upon L and R), this technique does not help. Examples of such encoders are encoders made in accordance with the standards referred to as MPEG Layers I and II. Further, even when used with S and D encoders, the technique may result in overcoding. This is because the technique does not always identify signals for which additional noise unmasking protection is unnecessary. Instead, it merely adds additional noise masking protection, based upon adjusted S and D masking thresholds, if the L masking threshold and the R masking threshold are similar.

SUMMARY OF THE INVENTION

We have recognized that the L masking threshold and the R masking threshold may be advantageously adjusted to reduce the effect of noise unmasking. More specifically, a given time block of a stereo audio signal comprises a left channel signal and a right channel signal, each of which are represented in a frequency domain by a first plurality of frequency partitions and a second plurality of frequency partitions, respectively. For a frequency partition from the first plurality of frequency partitions and a corresponding frequency partition from the second plurality of frequency partitions, a technique executed in accordance with the invention first calculates a set of masking thresholds comprising a left channel masking threshold and a right channel masking threshold. Next, based upon the set of masking thresholds, an adjusted left channel masking threshold and an adjusted right channel masking threshold is calculated. These adjusted thresholds are adjusted to reduce effects of noise unmasking. Finally, based upon the adjusted thresholds, a portion of the stereo audio signal may be encoded.

Advantageously, audio signals may be encoded with adjusted L and R that were generated based upon L and R thresholds wherein the adjusted L and R thresholds reduce the effects of noise unmasking.

Also advantageously, adjusted L and R thresholds may be generated based upon S and D thresholds, in addition to L and R thresholds, in order to identify signals that do not need additional noise unmasking protection, and thus, prevent unnecessary overcoding.

Other advantages of the present invention will be apparent from the detailed description and associated figures.

DETAILED DESCRIPTION

Figure 1:
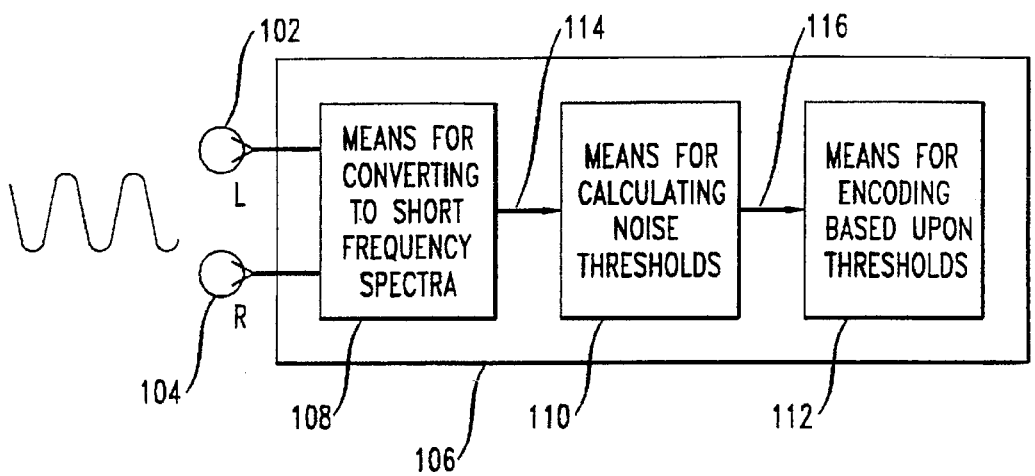
FIG. 1 shows an encoder for perceptually encoding a stereophonic audio signal.

Referring to FIG. 1, a flint microphone 102 and a second microphone 104 detect audio signals and pass the audio signals to an encoder 106. The encoder comprises a means for converting the audio signals to a series of short term frequency spectra 108 ("means for converting 108"), a means for calculating noise thresholds 110 ("means for calculating 110"), and a means for encoding based upon the noise thresholds 112 ("means for encoding 112"), all connected as shown. The means for calculating 110 is coupled to the means for converting 108 and to the means for encoding 112 via a first bus 114 and a second bus 116, respectively.

As is well known in the art, the means for converting 108 may be accomplished with methods such as FFTs and others. See, e.g., Malvar, Henrique, "Signal Processing With Lapped Transforms", Artech House (1992). There is a particular odd frequency FFT whose real part is equivalent to an MDCT. With reference to the text below, we will use the term MDCT to refer to the real part of the particular odd frequency FFT. The common thread amongst all of these techniques, as used in the present environment, is that they all output complex spectra for both the left and right channels. Thus, for a given time block, L and R have a frequency spectrum.

Figure 2:
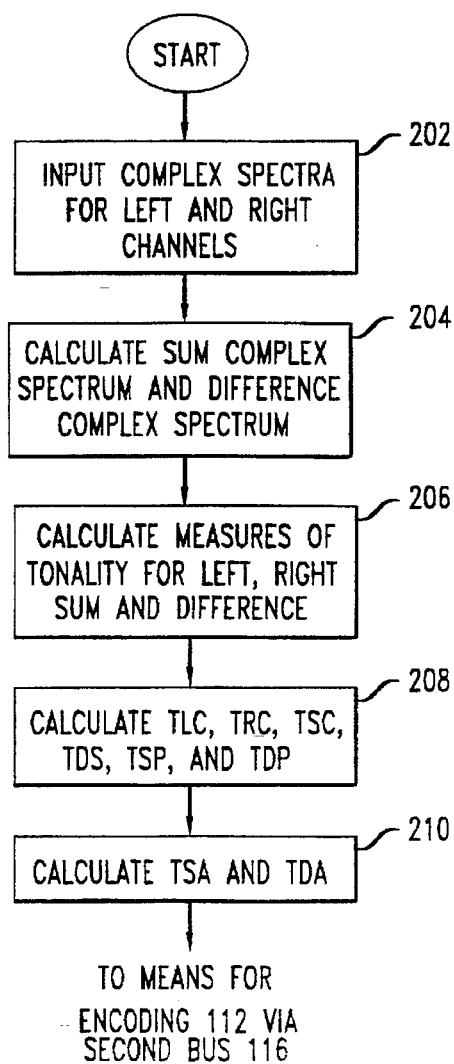
FIG. 2 shows a flowchart of a known method for adjusting S and D thresholds to account for noise unmasking when used within the environment of FIG. 1.

Referring to FIG. 2, a known method that can be used by the means for calculating 110 is described. First, as mentioned above, bus 114 inputs complex spectra representing L and R into the means for calculating 110. This is shown as function block 202. We will now describe what happens to a left complex spectrum and a corresponding right complex spectrum.

Again referring to FIG. 2, as shown in function block 204, for the left complex spectrum and the corresponding right complex spectrum, a sum complex spectrum and a difference complex spectrum are calculated. Next, as shown in function block 206, a left measure of tonality, a right measure of tonality, a sum measure of tonality, and a difference measure of tonality are calculated based upon the left complex spectrum, right complex spectrum, the sum complex spectrum, and the difference complex spectrum, respectively. Examples of how to calculate measures of tonality may be found in the U.S. Pat. No. 5,040,217 ("the '217 patent") which is assigned to the assignee of the present invention and incorporated herein as if set forth in its entirety. Next, as shown in function box 208, based upon the left complex spectrum, right complex spectrum, the sum complex spectrum, and the difference complex spectrum, and their respective measures of tonality, a set of masking thresholds is calculated. The set of masking thresholds comprises a left channel masking threshold, TLC, a right channel masking threshold, TRC, a sum channel masking threshold, TSC, and a difference channel masking threshold TDC. The manner in which TLC, TRC, TSC, and TDC are calculated is described in U.S. Pat. No. 5,285,498 ("the '498 patent") which is incorporated by reference as if set forth in its entirety. However, these masking thresholds, TLC, TRC, TSC, and TDC, are not adjusted to reduce the effects of noise unmasking. Also calculated, as shown in function box 208, is a sum channel protected masking threshold, TSP, and a difference channel protected masking threshold, TDP. These masking thresholds, TSP and TDP, represent the smallest quantization step size that may be required to account for noise unmasking under the conditions that TLC is approximately equal to TRC and encoding will be done using S and D (as opposed to L and R). The manner in which it is determined that TLC is approximately equal to TRC and the subsequent manner in which to calculate TSP and TDP is described in the '498 patent. In the '498 patent, thresholds TLC, TRC, TSC, TDC, TSP, and TDP are referred to as $THR_l$, $THR_r$, $BTHR_m$, $BTHR_s$, $MLD_m$, and $MLD_s$, respectively.

Still referring to FIG. 2, alter calculating the set of masking thresholds (TLC, TRC, TSC, TDC, TSP, and TDP), as shown in box 210, an adjusted sum channel masking threshold, TSA and an adjusted difference channel masking threshold, TDA are calculated as described in the '498 patent. In the '498 patent TSA and TDA are referred to as $THR_m$ and $THR_s$, respectively.

Figure 3:
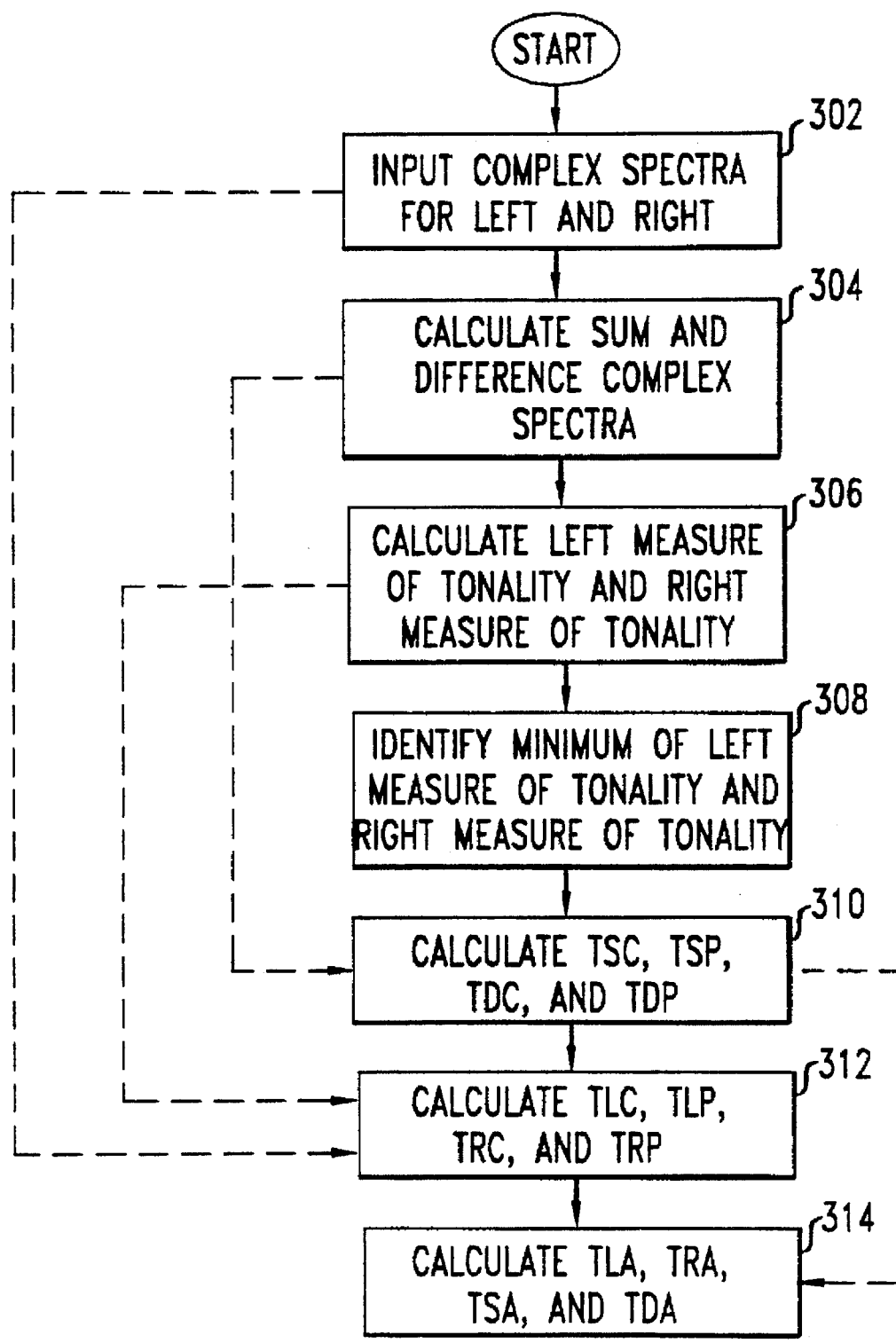
FIG. 3 shows a flowchart of the present invention for adjusting L, R, S, and D thresholds to account for noise unmasking thresholds when used within the environment of FIG. 1.

Referring to FIG. 3, a method in accordance with the present invention that can be used by the means for calculating 110 is described. It should be noted that the solid arrows in FIG. 3 indicate the order of steps. The dashed arrows going from function block to function block indicate that information from one function block is needed as an input to another function block.

Again referring to FIG. 3, a first bus 114 inputs complex spectra representing both L and R into the means for calculating 110. This is shown as function block 302. We will now describe what happens to a left complex spectrum (e.g., a first plurality of frequency partitions) and a corresponding right complex spectrum (e.g., a second plurality of frequency partitions). The first plurality of frequency partitions and the second plurality of frequency partitions are partitioned as shown in Table I. Table I shows 857 points in the left complex

TABLE I

| Partition Number | Lowest Spectrum Line In Partition | Highest Spectrum Line In Partition |
|---|---|---|
| 1 | 1 | 2 |
| 2 | 3 | 4 |
| 3 | 5 | 6 |
| 4 | 7 | 8 |
| 5 | 9 | 10 |
| 6 | 11 | 12 |
| 7 | 13 | 14 |
| 8 | 15 | 16 |
| 9 | 17 | 18 |
| 10 | 19 | 20 |
| 11 | 21 | 22 |
| 12 | 23 | 24 |
| 13 | 25 | 26 |
| 14 | 27 | 28 |
| 15 | 29 | 30 |
| 16 | 31 | 32 |
| 17 | 33 | 34 |
| 18 | 35 | 36 |
| 19 | 37 | 38 |
| 20 | 39 | 41 |
| 21 | 42 | 44 |
| 22 | 45 | 47 |
| 23 | 48 | 50 |
| 24 | 51 | 53 |
| 25 | 54 | 56 |
| 26 | 57 | 59 |
| 27 | 60 | 62 |
| 28 | 63 | 66 |
| 29 | 67 | 70 |
| 30 | 71 | 74 |
| 31 | 75 | 78 |
| 32 | 79 | 82 |
| 33 | 83 | 87 |
| 34 | 88 | 92 |
| 35 | 93 | 97 |
| 36 | 98 | 103 |
| 37 | 104 | 109 |
| 38 | 110 | 116 |
| 39 | 117 | 123 |
| 40 | 124 | 130 |
| 41 | 131 | 138 |
| 42 | 139 | 147 |
| 43 | 148 | 156 |
| 44 | 157 | 166 |
| 45 | 167 | 176 |
| 46 | 177 | 187 |
| 47 | 188 | 198 |
| 48 | 199 | 210 |
| 49 | 211 | 223 |
| 50 | 224 | 236 |
| 51 | 237 | 250 |
| 52 | 251 | 265 |
| 53 | 266 | 281 |
| 54 | 282 | 298 |
| 55 | 299 | 316 |
| 56 | 317 | 335 |
| 57 | 336 | 356 |
| 58 | 357 | 379 |
| 59 | 380 | 404 |
| 60 | 405 | 434 |
| 61 | 435 | 468 |
| 62 | 469 | 508 |
| 63 | 509 | 557 |
| 64 | 558 | 619 |
| 65 | 620 | 700 |
| 66 | 701 | 813 |
| 67 | 814 | 857 | spectrum and how the spectral points are divided into the first plurality of frequency partitions. Preferably, at a sampling rate of 48 kHz, the spectral points are evenly spaced and occur every 24,000/1024 Hz (approximately 24 Hz). More specifically, we will now describe calculating a set of adjusted noise masking thresholds for a frequency partition from the first plurality of frequency partitions and a corresponding frequency partition from the second plurality of frequency partitions.

Yet again referring to FIG. 3, as shown in function block 304, for the left complex spectrum and the corresponding right complex spectrum a sum complex spectrum and a difference complex spectrum are calculated. Next, as shown in function block 306, a left measure of tonality and a right measure of tonality are calculated based upon the left complex spectrum and the right complex spectrum, respectively. An examples of how to calculate measure of tonality may be found in the '217 patent. Next, as shown in function block 308, the measure of tonality for the left complex spectrum and right complex spectrum are compared and the minimum of the two values is chosen. As shown in function box 310, the minimum is used, in conjunction with the sum complex spectrum to calculate TSC and TSP. This is a first portion of a set of masking thresholds. Of course, the TSC and TSP calculated in box 310 will differ from the TSC and TSP calculated with reference to FIG. 2 because the measure of tonality used is different. As also shown in function box 310, the minimum is used, in conjunction with the difference complex spectrum to calculate TDC and TDP. This is a second portion of the set of masking thresholds. Of course, the TDC and TDP calculated in box 310 will differ from the TDC and TDP calculated with reference to FIG. 2 because the measure of tonality used is different.

Still referring to FIG. 3, as shown in box 312, a third portion and a fourth portion of the set of masking thresholds is calculated. TLC and TLP are calculated from the left complex spectrum and the measure of tonality for the left complex spectrum. Likewise, TRC and TRP are calculated from the right complex spectrum and the measure of tonality for the right complex spectrum.

Still referring to FIG. 3, the set of masking thresholds comprises the first portion, the second portion, the third portion, and the fourth portion which are, TSC and TSP, TDC and TDP, TLC and TLP, and TRC and TRP, respectively. As shown in function box 314, from these eight values which comprise the set of masking thresholds, the set of adjusted noise masking thresholds is calculated according to the following equations:

$$TLA = \text{Max}[\text{Min}[TLP, TLC], TLC \times Q] \quad (1)$$

$$TRA = \text{Max}[\text{Min}[TRP, TRC], TRC \times Q] \quad (2)$$

$$TSA = \text{Min}[TLC, TRC, \text{Max}[TSC, \text{Min}[TDC, TDP]]] \quad (3)$$

$$TDA = \text{Min}[TLC, TRC, \text{Max}[TDC, \text{Min}[TSC, TSP]]] \quad (4)$$

wherein $$Q = \{\text{Min}[TSC, TDC]/\text{Max}[TSC, TDC]\} \quad (5)$$

$$\text{Max}[a, b] = a \text{ if } a \geq b \text{ and } b \text{ if } b > a \quad (6)$$

$$\text{Min}[a, b] = a \text{ if } a \leq b \text{ and } b \text{ if } b < a \quad (7)$$

Figure 4:
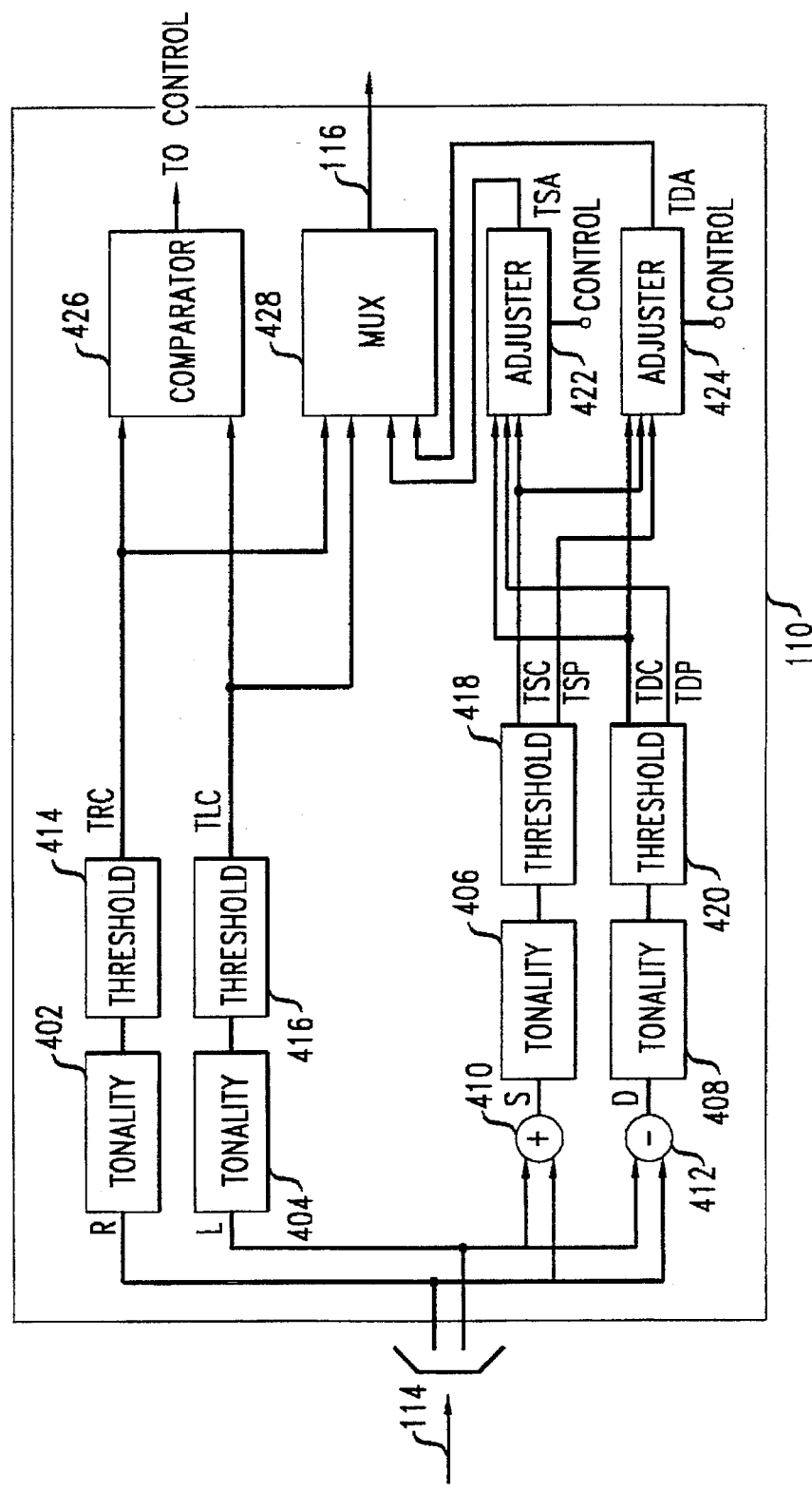
FIG. 4 is a detailed block diagram of an encoder capable of calculating noise masking thresholds in accordance with the steps shown in the flowchart of FIG. 2.

Referring to FIG. 4, a detailed block diagram of an encoder capable of calculating noise masking thresholds in accordance with the steps shown in the flowchart of FIG. 2 is shown. The detailed block diagram of the means for calculating 110 comprises tonality calculators 402, 404, 406, and 408, summer 410, subtractor 412, threshold calculators 414, 416, 418, and 420, adjusters 422 and 424, comparator 426, and multiplexer 428 all connected as shown. Essentially, the means for calculating 110 uses R and L as inputs, via bus 114, and outputs TLC, TRC, TSA, and TDA, via multiplexer 428, onto output bus 116. Note that the comparator 426 compares TRC and TLC to determine if they are "similar." This produces a control signal used to control adjusters 422 and 424. Calculation of the measure of similarity is discussed in the '498 patent.

Figure 5:
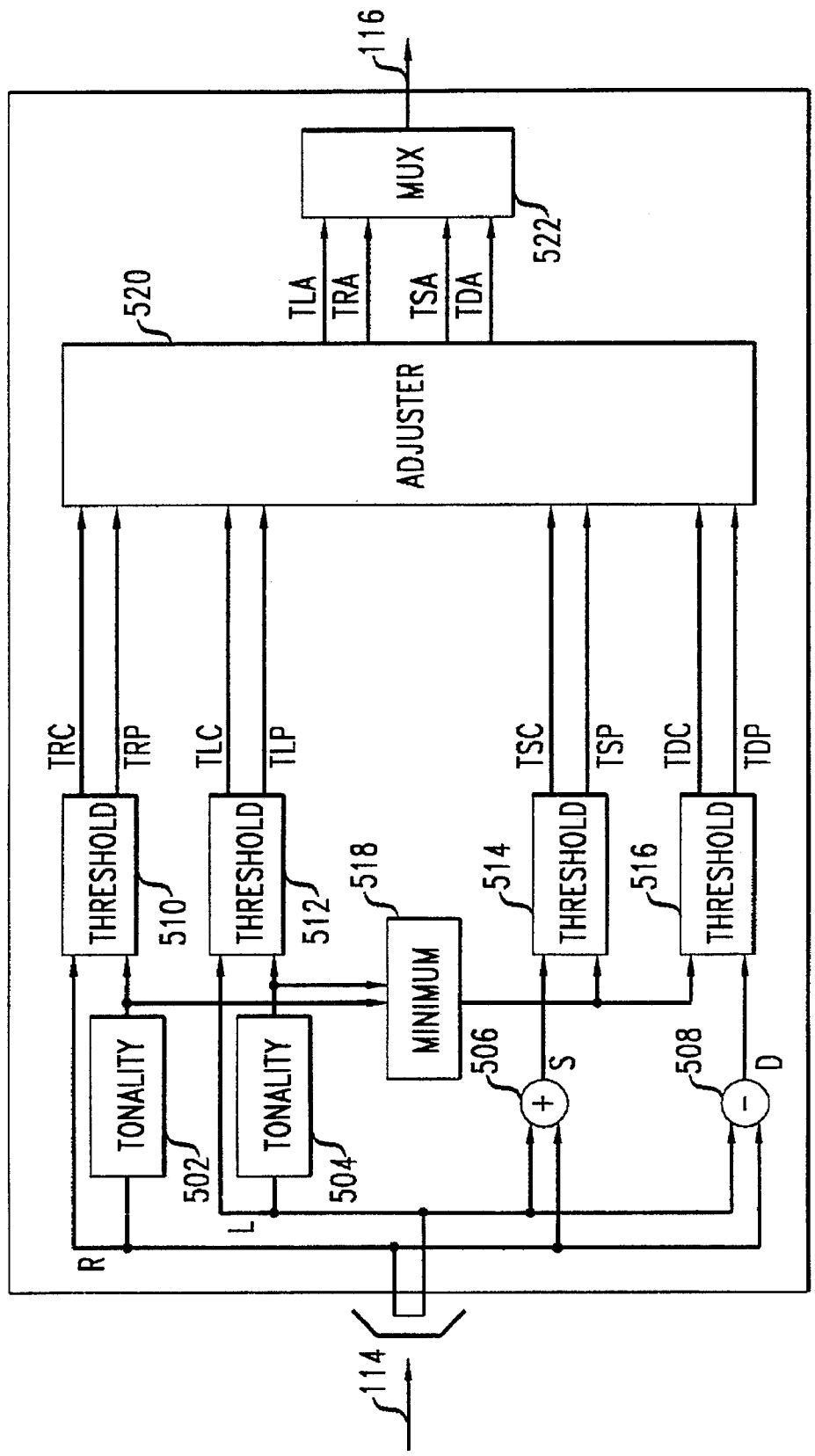
FIG. 5 is a block diagram of a portion of an encoder capable of calculating noise masking thresholds in accordance with the steps shown in the flowchart of FIG. 3.

Referring to FIG. 5, a block diagram of a portion of an encoder capable of calculating noise masking thresholds in accordance with the steps shown in the flowchart of FIG. 3 is shown. The detailed block diagram of the means for calculating 110 comprises tonality calculators 502 and 504, adder 506, subtractor 508, threshold calculators 510, 512, 514, and 516, a selector 518, an adjuster 520, and a multiplexer 522 all connected as shown. Essentially, the means for calculating 110 uses R and L as inputs, via bus 114, and outputs TLA, TRA, TSA, and TDA, via multiplexer 522, onto output bus 116. Note that the selector 518 simply selects the minimum of the two tonality values that are input into it. Also, note that the adjuster 520 implements equations (1) through (5) above.

With reference to FIGS. 3 and 5, the explanations above describe how to calculate TLA, TRA, TSA, and TDA for a frequency partition from the first plurality of frequency partitions and a corresponding frequency partition from the second plurality of frequency partitions. However, additional calculations are necessary to encode, e.g., a time block, e.g., 20 msec. in length, of the audio signal. First, TLA, TRA, TSA, and TDA must be calculated for a set of frequency partitions wherein a first frequency partition in the set of frequency partitions is from the first plurality of frequency partitions and a corresponding second frequency partition in the set of frequency partitions is from the second plurality of frequency partitions. When this is complete, the result will be N sets of adjusted noise masking thresholds (TLA$_I$, TRA$_I$, TSA$_I$, and TDA$_I$, wherein N is equal to the number of frequency partitions in the first set of frequency partitions (and, consequently, also equal to the number of frequency partitions in the second set of frequency partitions) and wherein 'I' is an index to the set of frequency partitions within the left complex spectrum and right complex spectrum. After this is done, the process may be repeated for each time block of the audio signal that is to be encoded.

In order to encode a time block, the left complex spectrum, right complex spectrum, TLA$_I$, TRA$_I$, TSA$_I$, and TDA$_I$, for each "I," are operated upon as follows:

(a) The real part of the left complex spectrum ("left MDCT") and the real part of the right complex spectrum ("right MDCT") are defined into M coder bands (as opposed to N partitions) in accordance with Table II. Table II shows 1024 points in the left MDCT and how the MDCT points are divided into coder bands. Preferably, at a sampling rate of 48 kHz the MDCT points are evenly spaced and occur every 24,000/1024 Hz (approximately 24 Hz).

(b) A further adjusted set of thresholds (i.e., final thresholds: TLF, TRF, TSF, and TDF) for each of the forty nine coder bands shown in Table II is calculated in accordance with the '498 patent at column 17 line 54 through column 18, line 50. However, it should be noted that in the '498 patent, the final set of thresholds is calculated based upon the equivalent of TLC, TRC, TSA, and TDA which are referred to in the '498 patent as THR$_l$, THR$_r$, THR$_s$, and THR$_d$, respectively. The '498 patent details how to convert from one threshold, e.g., TLA, to another threshold, TLF, for an individual threshold. Thus, for example, in converting from TLA to TLF, one would use the value for TLA as the value for $nb_b$ in column 17, line 63 of the '498 patent. This would result in TLF being output as $nband_w$ as shown in the equation on column 18, lines 28–29 of the '498 patent.

(c) Each coder band in the left MDCT, the right MDCT, the sum MDCT, and the difference MDCT is encoded with either TLF and TRF as applied to the left MDCT and the right MDCT, respectively or TSF and TDF as applied to the sum MDCT and difference MDCT, respectively, depending upon which method of encoding requires fewer bits. Preferably, after the decision between left/right or sum/difference coding has been made for each coder band, the bit rate adjustment process as described in the '498 patent at column 21, line 54 through column 24, line 46 is implemented.

TABLE II

| Coder Band Number | Lowest Spectrum Line In Band | Highest Spectrum Line In Band |
| --- | --- | --- |
| 1 | 1 | 4 |
| 2 | 5 | 8 |
| 3 | 9 | 12 |
| 4 | 13 | 16 |
| 5 | 17 | 20 |
| 6 | 21 | 24 |
| 7 | 25 | 28 |
| 8 | 29 | 32 |
| 9 | 33 | 36 |
| 10 | 37 | 40 |
| 11 | 41 | 48 |
| 12 | 49 | 56 |
| 13 | 57 | 64 |
| 14 | 65 | 72 |
| 15 | 73 | 80 |
| 16 | 81 | 88 |
| 17 | 89 | 96 |
| 18 | 97 | 108 |
| 19 | 109 | 120 |
| 20 | 121 | 132 |
| 21 | 133 | 144 |
| 22 | 145 | 156 |
| 23 | 157 | 172 |
| 24 | 173 | 188 |
| 25 | 189 | 204 |
| 26 | 205 | 224 |
| 27 | 225 | 244 |
| 28 | 245 | 264 |
| 29 | 265 | 288 |
| 30 | 289 | 312 |
| 31 | 313 | 340 |
| 32 | 341 | 368 |
| 33 | 369 | 400 |
| 34 | 401 | 432 |
| 35 | 433 | 464 |
| 36 | 465 | 496 |
| 37 | 497 | 528 |
| 38 | 529 | 560 |
| 39 | 561 | 592 |
| 40 | 593 | 624 |
| 41 | 625 | 656 |
| 42 | 657 | 688 |
| 43 | 689 | 720 |
| 44 | 721 | 752 |
| 45 | 753 | 784 |
| 46 | 785 | 816 |
| 47 | 817 | 848 |
| 48 | 849 | 880 |
| 49 | 881 | 1024 |

The present invention has been described in the environment of a stereo encoder. However, those skilled in the art will realize that there are many modifications that may be made to the above described invention. For example, the invention may be used in any multi-channel (e.g., five channel) encoding system. Additionally, the invention may be used to manufacture a digital storage medium (e.g., compact disk, CD-ROM, Digital Audio Tape, etc . . . ). Additionally, the invention may be used in noise measuring instrumentation. Still further, the invention may be used in a transmission environment (e.g., digital audio broadcast) rather than a recording enviromnent. Thus, the invention is defined by the appended claims.

What we claim is:

1. A method of encoding a time block from a set of ordered time blocks of an audio signal, the time block of the audio signal comprising a left channel signal and a right channel signal, the left channel signal and the right channel signal being represented in a frequency domain by a first plurality of frequency partitions and a second plurality of frequency partitions, respectively, the method comprising, for a frequency partition from the first plurality of frequency partitions and a corresponding frequency partition from the second plurality of frequency partitions, the steps of:

(a) calculating a set of masking thresholds comprising a left channel masking threshold and a right channel masking threshold;

(b) based upon the set of masking thresholds, calculating an adjusted left channel masking threshold and an adjusted right channel masking threshold wherein the adjusted left channel masking threshold and the adjusted right channel masking threshold are adjusted to reduce effects of noise unmasking; and (c) based upon the adjusted left channel masking threshold and the adjusted right channel masking threshold, encoding the frequency partition and the corresponding frequency partition to generate an encoded signal.

2. The method of claim 1 further comprising the step of calculating a second set of masking thresholds comprising a sum channel masking threshold and a difference channel masking threshold and wherein the adjusted left channel masking threshold and the adjusted right channel masking threshold are also based upon the second set of masking thresholds.

3. The method of claim 2 further comprising calculating, based upon the set of masking thresholds and the second set of masking thresholds, an adjusted sum channel masking threshold and an adjusted difference channel masking threshold, wherein the adjusted sum channel masking threshold and the adjusted difference channel masking threshold are adjusted to reduce effects of noise unmasking and wherein the step of encoding the frequency partition and the corresponding frequency partition is also based upon the adjusted sum channel masking threshold and the adjusted difference channel masking threshold.

4. The method of claim 3 further comprising repeating the method of claim 3 for a first set of remaining frequency partitions from the first plurality of frequency partitions and a corresponding second set of remaining frequency partitions from the second plurality of frequency partitions.

5. The method of claim 4 further comprising encoding a remaining set of time blocks from the set of ordered time blocks.

6. A method of encoding a time block from a set of ordered time blocks of an audio signal, the time block of the audio signal being represented by a left channel signal and a right channel signal, the left channel signal and the right channel signal being represented by a first plurality of frequency partitions and a second plurality of frequency partitions, respectively, the method comprising, for a frequency partition from the first plurality of frequency partitions and a corresponding frequency partition from the second plurality of frequency partitions, the steps of:

(a) calculating a set of masking thresholds comprising a left channel masking threshold and a right channel masking threshold;

(b) calculating a second set of masking thresholds comprising a sum channel masking threshold and a difference channel masking threshold (c) based upon the set of masking thresholds and the second set of masking thresholds, calculating an adjusted sum channel masking threshold and an adjusted difference channel masking threshold wherein the adjusted sum channel masking threshold and the adjusted difference channel masking threshold are adjusted to help protect the left channel signal and right channel signal from noise unmasking; and (d) based upon the adjusted left channel masking threshold and the adjusted right channel masking threshold, encoding the frequency partition and the corresponding frequency partition to generate an encoded signal.

* * * * *